UNITED STATES PATENT OFFICE.

COMMERCIAL MANUFACTURING COMPANY CONSOLIDATED, OF NEW YORK, N. Y., ASSIGNEE, BY MESNE ASSIGNMENTS, OF HIPPOLYTE MÈGE, DECEASED.

TREATING ANIMAL-FATS.

SPECIFICATION forming part of Reissued Letters Patent No. 10,137, dated June 13, 1882.

Original No. 146,012, dated December 30, 1873; Reissue No. 5,868, dated May 12, 1874; Reissue No. 8,424, dated September 24, 1878; application for reissue filed May 20, 1882.

*To all whom it may concern:*

Be it known that HIPPOLYTE MÈGE, of Paris, France, now deceased, chemist manufacturer, did invent an Improved Means for Transforming Animal-Fat into Butter, of which the following is a specification.

This invention, which is the result of physiological investigations, consists of artificially producing the natural work which is performed by the cow when it reabsorbs its fat in order to transform the same into butter. The improved means he employed for this purpose are as follows:

I. *Neutralization of the ferments.*—In order to prevent the greasy substance which is settled in the tissue of the animals from taking the disagreeable taste of the fat, it is necessary that the ferments which produce this taste shall be completely neutralized. For this effect, as soon as possible after the death of the animal he plunged the raw fats, called "graisses en branches," into water containing fifteeen per cent. of sea-salt and one per cent. of sulphite of soda. He began thus the transformation an hour at least after the immersion and twelve hours at most afterward II. *Crushing.*—A complete crushing is necessary in order to obtain rapid work without alteration. For this purpose when the substance is coarsely crushed he let it fall from the cylinders under millstones, which completely bruise all the cells.

III. *Concentrated digestion.*—The crushed fat falls into a vessel which is made of well-tinned iron, or enameled iron, or baked clay. This vessel must be plunged in a water bath of which the temperature is raised at will. When the fat has descended in the vessel he melted it by means of an artificial digestion, so that the heat does not exceed 103° Fahrenheit, and thus no taste of fat is produced. For this purpose he threw into the wash-tub containing the artificial gastric juice about two liters per hundred kilograms of greasy substance. This gastric juice is made with the half of a stomach of a pig or sheep well washed and three liters of water containing thirty grams of biphosphate of lime. After a maceration during three hours he passed the substance through a fine sieve and obtained the two liters which are necessary for a hundred kilograms. He slowly raised the temperature to about 103° Fahrenheit, so that the matter shall completely separate. This greasy matter must not have any taste of fat. It must, on the contrary, have the taste of molten butter. When the liquid does not present any more lumps he threw into the said liquid one kilogram of sea-salt (reduced to powder) per hundred kilograms of greasy matter. He stirred during a quarter of an hour and let it set until obtaining perfect limpidness. This method of extraction has a considerable advantage over that which has been previously essayed. The separation is well made and the organized tissues which do deposit are not altered.

IV. *Crystallization in a mass.*—In order to separate the oleomargarine of the stearine, separated crystallizers or crystallizations at unequal temperatures have been already employed. He contrived for this purpose the following method, which produces a very perfect separation, and is as follows. He rendered the molten fat in a vessel which must be sufficient for containing it. This vessel is placed in a wash-tub of strong wood, which serves as a water bath. In this wash-tub he put water at the fixed temperature of 86° Fahrenheit for the soft fats proceeding from the slaughter-houses, and 98° for the harder fats, such as mutton-fat. Afterward the wash-tubs are covered and after a certain time, more or less long according to the fats, the stearine is deposited in the form of teats at the middle of the oleomargaric liquid.

V. *Separation by centrifugal force.*—In order to avoid the numerous inconveniences of the employment of the presses which have been hitherto used, he caused the mixture of stearine and oleomargarine to flow into a centrifugal machine called "hydro-extractor." The greasy liquid passes through the cloth and the stearine is collected. When all the liquid is passed he put the machine in motion, and the crystals of stearine are entirely exhausted without the auxiliary of the presses. However, during certain seasons there are animals which produce crystals of stearine soft enough for rendering necessary the stroke of a press as a last operation; but in this case this operation has little importance, because it is applied only to a fraction of the product. In all cases the oleomargarine is separated from the stearine when it is cold and passed to the cylinder, constituting, especially if its yellow color has been raised, a greasy matter of very good taste, and which may replace the butter in the kitchen, where it is employed under the name of "margarine;" but if it is desired to transform it into more perfect butter, he employed the following means:

VI. In the methods hitherto employed the margarine is transformed into cream, and this latter into butter. This complicated operation has many inconveniences. He obtained the same result by the following manner: He took ten liters of natural and fresh cream of milk. He added ten grams of bicarbonate of soda and two hundred grams of the udders of a cow, which must be fresh and well hacked in order to give all the mammary pepsin. The fresh udder may be replaced by udder collected in slices in sea-salt. After a maceration of an hour he passed the whole through a very fine sieve. He added the necessary quantity of yellow color which is employed for the ordinary butter, and he put these ten liters into a hundred kilograms of liquid margarine at 70°. He stirred or mixed until the combination was complete—that is to say, until the pepsin had effectuated its action. At this moment the liquid becomes thick, it takes the taste of cream, and after it has been more thoroughly agitated he let the same become completely cold. When the butter was cold and solid he coarsely scraped it, in order to pass it between two large cylinders, which gave it the homogeneousness and the consistence which are the qualities of the natural butter.

VII. When it is desired to produce butter intended to be preserved, which must contain no animal matter, he plunged the udders into pure water, instead of cream, in order to macerate the same. Afterward the water which proceeds from this operation is mixed with the margarine at about 86° of temperature—that is to say, to a degree which permits the pepsin to effectuate its action without production of cream. After an hour he let the liquid set, and the margarine which is decanted is mixed, after it has been reduced in temperature to about 71°, with an emulsion of butter made with five liters of water, five kilograms of butter, one kilogram of sea-salt, or more, according to the uses, and ten kilograms of bicarbonate of soda. When he added this emulsion with the margarine, which had already been submitted to the peptic action, he obtained a rapid combination, and all the molecules take the qualities of the ordinary butter. It is a delicate operation, which must be very exactly made.

VIII. For the long conservations he only treated the margarine by the mammary pepsin, as before described. He decanted it in order to avoid any trace of water or animal matter. If it is desired to add ordinary butter, he did that at the temperature of 71° by well diluting it.

IX. The stearine which has been separated from the margarine forms a hard fat, which can be bleached by the known processes in order to produce wax-candles of lower quality; but it is preferable to saponify it by any convenient process and crystallize the greasy acids (which are charged with from seventy to eighty per cent. of stearic acid instead of fifty) in a chamber heated to 96°, so as not to let them become hard by the cooling. In this state they can be pressed under heat, in order to produce stearic acid much superior to that of the trade, both by its beauty and by its point of melting.

What is claimed is—

1. The improved material herein described, produced by treating animal-fats so as to remove the tissues and other portions named, with or without the addition of substances to change the flavor, consistency, or color, as set forth.

2. The process herein described of treating animal-fats in the production of oleomargarine.

THE COMMERCIAL MANUFACTURING COMPANY CONSOLIDATED. [L. S.]
CHAS. M. FIELD,
*President.*

Witnesses:
GEO. H. SONNEBORN,
WM. H. SONNEBORN.